(12) United States Patent
Osborne et al.

(10) Patent No.: US 10,430,569 B2
(45) Date of Patent: *Oct. 1, 2019

(54) MULTICOMPUTER SYSTEM FOR USER DATA AUTHENTICATION AND PROCESSING

(71) Applicant: Bank of America Corporation, Charlotte, NC (US)

(72) Inventors: Dennis M. Osborne, Clermont, FL (US); Daniel L. Carpenter, Matthews, NC (US); Xianhong Zhang, Issaquah, WA (US); Michael Toth, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/184,198

(22) Filed: Nov. 8, 2018

(65) Prior Publication Data

US 2019/0236248 A1 Aug. 1, 2019

Related U.S. Application Data

(63) Continuation of application No. 15/881,268, filed on Jan. 26, 2018, now Pat. No. 10,146,919.

(51) Int. Cl.
*H04M 1/56* (2006.01)
*H04M 15/06* (2006.01)
(Continued)

(52) U.S. Cl.
CPC ........... *G06F 21/313* (2013.01); *G06N 20/00* (2019.01); *H04M 15/06* (2013.01); *H04M 15/8351* (2013.01); *H04M 2203/6081* (2013.01)

(58) Field of Classification Search
USPC ........................................ 379/142.05, 142.04
See application file for complete search history.

(56) References Cited

U.S. PATENT DOCUMENTS

| 8,238,532 B1 | 8/2012 | Cox et al. |
| 9,001,985 B2 | 4/2015 | Cox et al. |

(Continued)

OTHER PUBLICATIONS

Aug. 31, 2018—U.S. Notice of Allowance—U.S. Appl. No. 15/881,268.

*Primary Examiner* — Quoc D Tran
(74) *Attorney, Agent, or Firm* — Banner & Witcoff, Ltd.; Michael A. Springs

(57) ABSTRACT

Aspects of the disclosure relate to multicomputer processing and authentication of user data associated with telephone calls. A call security assessment computing platform may receive data associated with a telephone call made from a user computing device. Subsequently, the call security assessment computing platform may parse the received data to identify header information in a Session Initial Protocol (SIP) header. The platform then may analyze the header information to generate a call fingerprint for the telephone call. This call fingerprint may then be transmitted to one or more call authentication computing platforms, which return one or more call security responses that may further characterize security features of the telephone call. The call fingerprint and the call security responses may then be used to determine a call security score, which may be transmitted in a notification to a call handling system in order to adjust how the call is handled.

20 Claims, 9 Drawing Sheets

(51) Int. Cl.
   *G06F 21/31*   (2013.01)
   *H04M 15/00*   (2006.01)
   *G06N 20/00*   (2019.01)

(56) References Cited

U.S. PATENT DOCUMENTS

| | | | | |
|---|---|---|---|---|
| 9,332,119 | B1* | 5/2016 | Danis | H04M 3/42042 |
| 9,762,728 | B1* | 9/2017 | Cox | H04M 3/42042 |
| 10,146,919 | B1* | 12/2018 | Osborne | G06N 20/00 |
| 2006/0233160 | A1* | 10/2006 | Kawanishi | H04L 29/06027 |
| | | | | 370/352 |
| 2009/0067410 | A1* | 3/2009 | Sterman | H04L 29/06027 |
| | | | | 370/352 |
| 2016/0226872 | A1* | 8/2016 | Oberheide | G06F 21/44 |

* cited by examiner

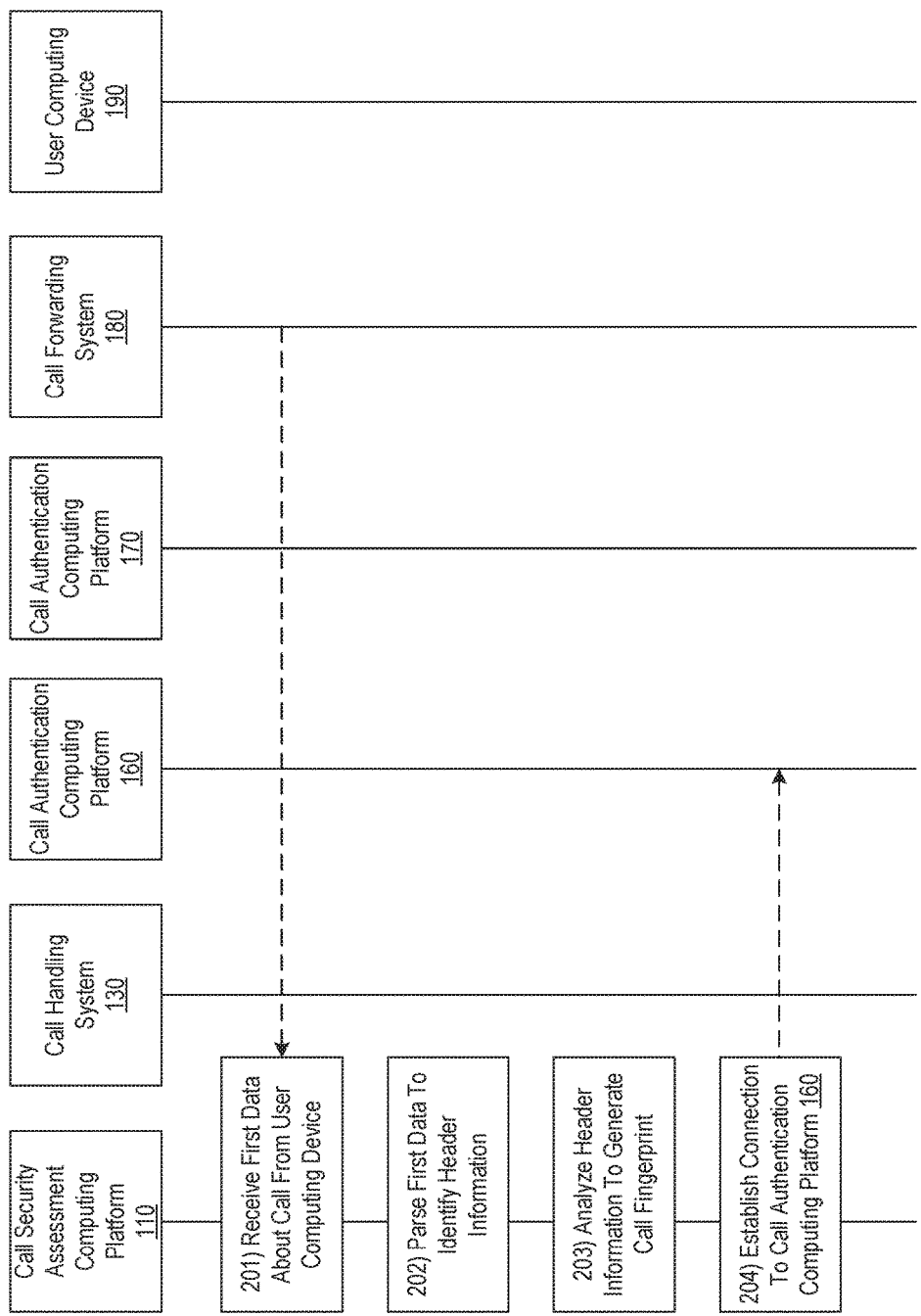

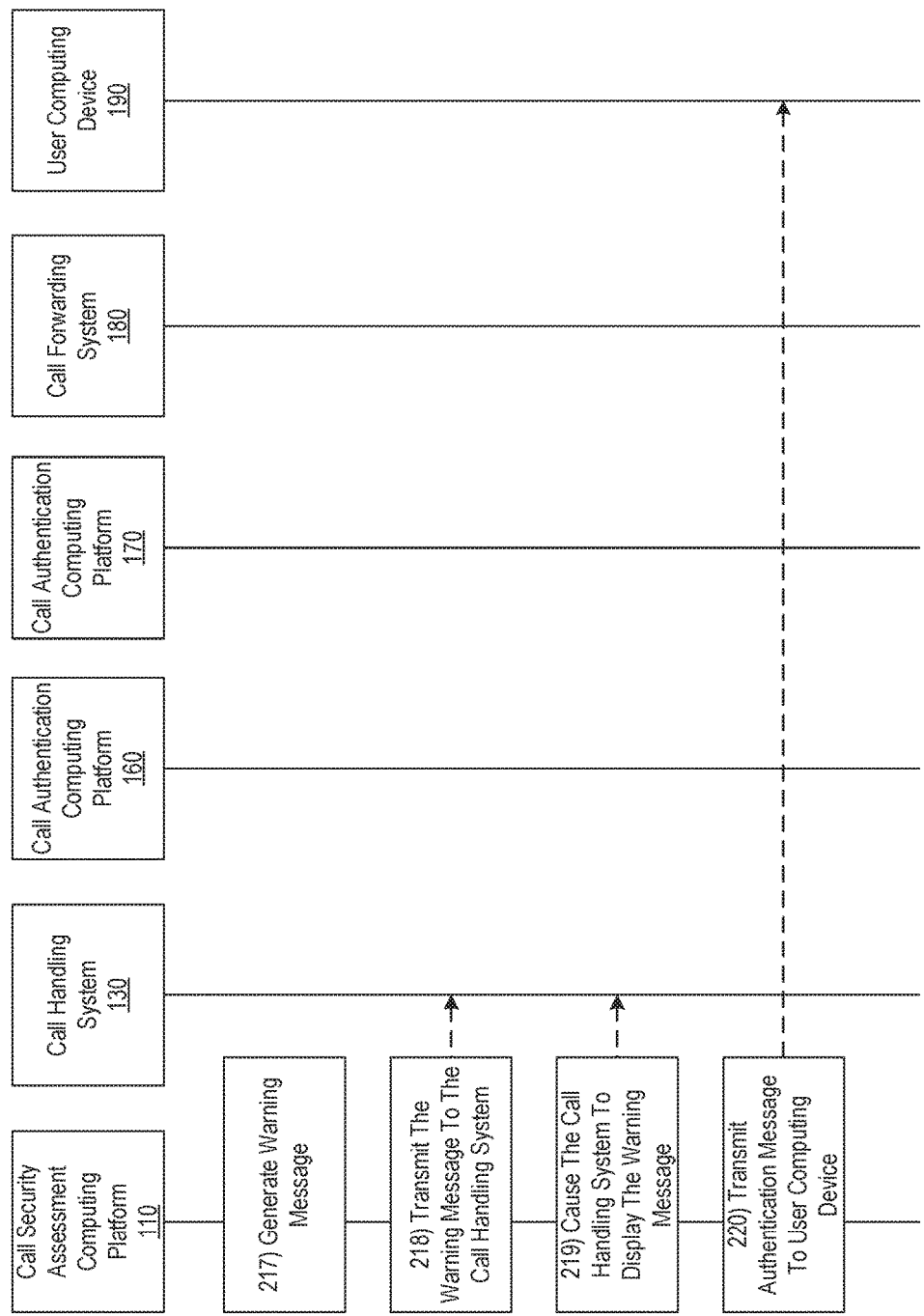

MULTICOMPUTER SYSTEM FOR USER DATA AUTHENTICATION AND PROCESSING

CROSS REFERENCE TO RELATED APPLICATIONS

This application is a continuation of and claims priority to co-pending U.S. application Ser. No. 15/881,268, filed Jan. 26, 2018, and entitled, "Multicomputer System for User Data Authentication and Processing," which is incorporated herein by reference in it entirety.

BACKGROUND

Aspects of the disclosure relate to electrical computers, digital processing systems, and multicomputer data processing. In particular, one or more aspects of the disclosure relate to enabling multicomputer processing and authentication of user data received from a telephone call forwarding system.

As computer systems are increasingly utilized to provide automated and electronic services, such computer systems may obtain and maintain increasing amounts of various types of sensitive information, and ensuring the safety, security, and accuracy of this information may be increasingly important. In many instances, however, it may be difficult to ensure the safety and security of such information while also optimizing the efficient and effective technical operations of the computer systems that process such information and/or provide such automated and electronic services.

SUMMARY

Aspects of the disclosure provide effective, efficient, scalable, and convenient technical solutions that address and overcome the technical problems associated with providing information security and optimizing the efficient and effective technical operations of computer systems. In particular, one or more aspects of the disclosure provide techniques for processing and authentication of user data using multicomputer data processing technology to improve information security and enhance technical performance.

In accordance with one or more embodiments, a call security assessment computing platform having at least one processor, a memory, and a communication interface may receive, via the communication interface, first data associated with a first telephone call made from a first user computing device. The call security assessment computing platform may then parse the first data to identify header information in a Session Initiation Protocol (SIP) header of the first data. Subsequently, the call security assessment computing platform may analyze the header information to generate a call fingerprint for the first telephone call. Then the call security assessment computing platform may establish, via the communication interface, a plurality of connections to a plurality of call authentication computing platforms. With the plurality of connections established, the call security assessment computing platform may transmit the call fingerprint to at least one of the plurality of call authentication computing platforms. Also, with the plurality of connections established, the call security assessment computing platform may receive at least one call security response from the at least one of the plurality of call authentication computing platforms. The at least one call security response may comprise data including an identification of a first user of the first user computing device and a record of any previous calls made from the first user computing device. Next, based on the call fingerprint and the at least one call security response, the call security assessment computing platform may determine a call security score for the first telephone call made by the first user computing device. Then the call security assessment computing platform may generate a first notification of the call security score to a call handling system. Finally, the call security assessment computing platform may transmit, via the communication interface, the first notification to the call handling system.

In some embodiments, at least one of the plurality of call authentication computing platforms may comprise a computing device configured to determine if the first telephone call is being spoofed by evaluating a first amount of time between the first telephone call and a second telephone call. The first telephone call may be made with the first user computing device from a first location and the second telephone call may be made with the first user computing device from a second location. In some aspects, determining if the first telephone call is being spoofed may further comprise determining a minimum amount of time for travelling between the first location and the second location and determining that the first telephone call is being spoofed when the first amount of time is less than the minimum amount of time.

In other embodiments, analyzing the header information may comprise identifying whether the first telephone call was made from a mobile phone or landline, a location from which the first telephone call was made, and a phone number from which the first telephone call was made. Analyzing the header information may further comprise setting an initial call security level based on the identifying.

Further still, the call security assessment computing platform may identify a number and type of questions to ask the first user based on the call security score and may transmit, via the communication interface, the questions to the call handling system. In this aspect, the number of questions may be greater and the type of questions may be more detailed as the call security score is lower. In some embodiments, the call security assessment computing platform may generate, based on the call security score, a command configured to allow the first user to access other systems when the questions are answered correctly and may transmit, via the communication interface, the command to the call handling system.

In some embodiments, at least one of the plurality of call authentication computing platforms may comprise a machine learning system that uses predetermined rules to evaluate security features of the first telephone call.

In some aspects, the header information may include information related to whether the first user computing device comprises a mobile device or a landline. In other aspects, the header information may comprise information related to whether the first user computing device was roaming when the first telephone call was made.

In some aspects, determining the call security score may comprise comparing the call fingerprint and the at least one call security response to an expected call fingerprint and expected call security response.

In other aspects, the call security assessment computing platform may route the first telephone call to one of a plurality of agents in communication with the call handling system based on the call security score. Further, the call security assessment computing platform may generate a warning message to be transmitted to the call handling system, transmit the warning message to the call handling system via the communication interface, and cause the call handling system to display the warning message or adjust the handling of the first telephone call.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for multicomputer processing and authentication of user data in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosure relate to user telephone call data authentication and processing. In some aspects, a call fingerprint and call security score may be generated for the user telephone call data.

Figure 1A:
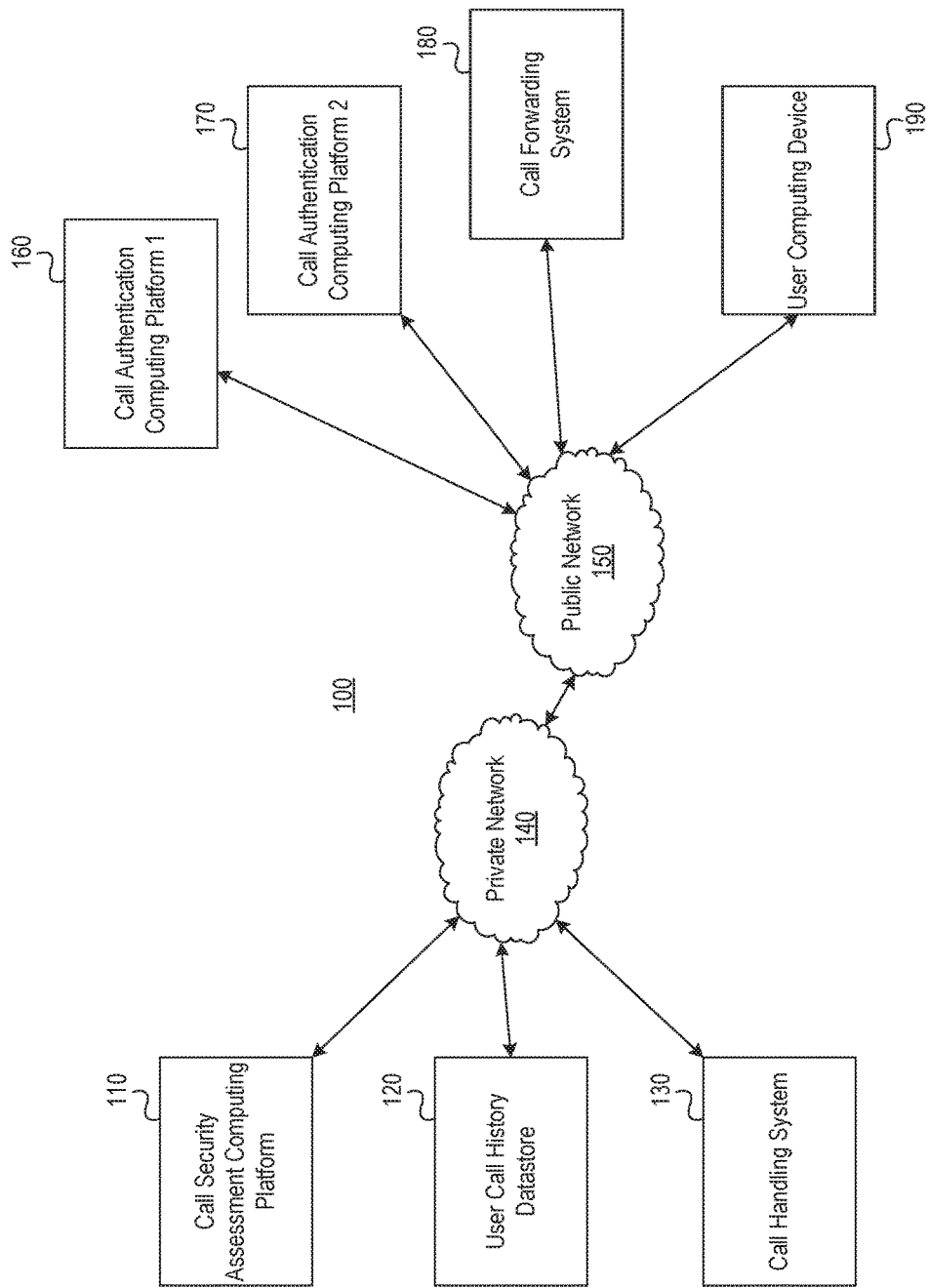
FIGS. 1A and 1B depict an illustrative computing environment for user data authentication and processing executed across multiple computing platforms and devices in accordance with one or more example embodiments.

Referring to FIG. 1A, computing environment 100 may include one or more computer systems, one or more computer networks, and/or other computing infrastructure. For example, computing environment 100 may include a call security assessment computing platform 110, a user call history datastore 120, a call handling system 130, a private network 140, a public network 150, a first call authentication computing platform 160, a second call authentication computing platform 170, a call forwarding system 180, and a user computing device 190.

As discussed in greater detail below, call security assessment computing platform 110 may include one or more computing devices configured to perform one or more of the functions described herein. For example, call security assessment computing platform 110 may include one or more computers (e.g., laptop computers, desktop computers, servers, server blades, or the like) that are configured to authenticate and process user telephone call data in computing environment 100. As discussed further below, call security assessment computing platform 110 may determine a call security score for a telephone call made to access systems secured by platform 110. This call security score may then be transmitted to call handling system 130 for use in processing the telephone call.

User call history datastore 120 may store data related to details of calls made from various user computing devices 190 trying to access systems secured by call security assessment computing platform 110. For example, user call history datastore 120 may store phone numbers associated with these user computing devices 190, names of users who own or operate these devices 190, information related to whether these user computing devices are mobile devices or landlines, the types of systems these user computing devices 190 accessed or tried to access, the number of times the user computing devices 190 accessed or tried to access these systems, and the location from which these user computing devices 190 accessed or tried to access these systems. User call history datastore 120 may further store information related to the authenticity of previous calls made from a given phone number or user computing device 190. In one instance, the systems secured by call security assessment computing platform 110 may provide financial services, including services for accessing and performing transactions related to a given user's financial accounts. Call security assessment computing platform 110 may access information stored in user call history datastore 120 to generate a call fingerprint of any telephone call made by user computing device 190 for accessing services secured by call security assessment computing platform 110. In some aspects, the call fingerprint may include characteristics of the telephone call that call security assessment computing platform 110 would use to assess the authenticity of the call. For example, in generating a call fingerprint, call security assessment computing platform 110 may evaluate the phone number of the user computing device 190 that made the telephone call, the identity of the user who owns user computing device 190, and the location from which the call was made. Platform 110 may access the information stored in user call history database 120 to authenticate a given telephone call. For example, platform 110 may determine that the telephone number from which the call was made has been saved in user call history datastore 120 as a result of previous calls made from this phone number and user call history datastore 120 may indicate that this phone number has previously been determined to be unauthentic. As a further example, platform 110 may determine that a current telephone call is coming from a mobile user computing device 190 and user call history datastore 120 may indicate that the phone number should be associated with a landline. Upon identifying this discrepancy, platform 110 may flag the current telephone call for further investigation.

Call handling system 130 may be a desktop computer, laptop computer, workstation, or other computing device that is configured to handle calls made to access computing systems secured by call security assessment computing platform 110. Once a given telephone call made from user computing device 190 is authenticated, call handling system 130 may provide the user computing device 190 with access to systems secured by platform 110. Alternatively, if the telephone call cannot be authenticated, then call handling system 130 may deny access to systems secured by platform 110. Furthermore, call security assessment computing platform 110 may generate and transmit one or more messages to call handling system 130. These messages may include warning messages that alert call handling system 130 as to any problems associated with authenticating a given telephone call associated with user computing device 190. Furthermore, platform 110 may generate one or more questions to be posed to a user of user computing device 190 to help platform 110 authenticate the telephone call made by device 190. Platform 110 may forward these questions to call handling system 130 so that call handling system 130 may pose the questions to the user of user computing device 190 and receive answers from the user. The answers may be evaluated for accuracy to determine if user computing device 190 should be given access to systems secured by call security assessment computing platform 110. In some aspects, call handling system 130 may also interface with one or more agents associated with systems secured by call security assessment computing platform 110. These agents may perform some or all of the tasks performed by an automated call handling system 130.

In some aspects, once call security assessment computing platform 110 determines that a telephone call made by user computing device 190 is likely not authentic and transmits the relevant questions to call handling system 130, call handling system 130 may pose these questions to the user of user computing device 190 and prevent the user from accessing systems secured by platform 110 regardless of the answer provided by the user. In addition or alternatively, platform 110 may forward a telephone call deemed to be likely unauthentic to a device used by and/or otherwise associated with a specialized agent trained to handle these types of calls.

Call authentication computing platform 160 may include one or more computing devices configured to provide a first call authentication service (which may, e.g., be provided by an organization different from the organization operating call security assessment computing platform 110 and/or call handling system 130). In some instances, call authentication computing platform 160 may run an application to identify information about a specific user computing device 190 or a user of user computing device 190. For example, platform 160 may run an application for identifying a user of user computing device 190. In other aspects, platform 160 may run an application for identifying any previous telephone calls to systems secured by platform 110 made from a given user computing device 190. In this regard, call authentication computing platform 160 may access a database that associates phone numbers with a record of their owners or a record of previous calls made by those phone numbers to systems secured by call security assessment computing platform 110. In some aspects, call authentication computing platform 160 may receive a call fingerprint generated by call security assessment computing platform 110. Platform 110 may request that platform 160 analyze the information contained in the call fingerprint to identify additional security features of the telephone call (e.g., an identification of the owner of user computing device 190 used to make the telephone call, an identification of previous calls made by user computing device 190, and the like). Once call authentication computing platform 160 has completed its analysis of the call fingerprint, platform 160 may transmit a call security response back to platform 110. This call security response may include the results of the analysis performed by call authentication computing platform 160.

Call authentication computing platform 170 may include one or more computing devices configured to provide a second call authentication service (which may, e.g., be provided by an organization different from the organization operating call security assessment computing platform 110 and/or call handling system 130). Additionally, the second call authentication service may be different from the first call authentication service (e.g., the second call authentication service may be provided by an organization different from the organization providing the first call authentication service). In some instances, call authentication computing platform 170 may run an application to identify information about a specific user computing device 190 or a user of user computing device 190. For example, platform 170 may run an application for identifying a user of user computing device 190. In other aspects, platform 170 may run an application for identifying any previous telephone calls to systems secured by platform 110 made from a given user computing device 190. In this regard, call authentication computing platform 170 may access a database that associates phone numbers and a record of their owners or a record of previous calls made by those phone numbers to systems secured by call security assessment computing platform 110. In some aspects, call authentication computing platform 170 may receive a call fingerprint generated by call security assessment computing platform 110. Platform 110 may request that platform 170 analyze the information contained in the call fingerprint to identify additional security features of the telephone call (e.g., an identification of the owner of user computing device 190 used to make the telephone call, an identification of previous calls made by user computing device 190, and the like). Once call authentication computing platform 170 has completed its analysis of the call fingerprint, platform 170 may transmit a call security response back to platform 110. This call security response may include the results of the analysis performed by call authentication computing platform 170.

Call security assessment computing platform 110 may use the call fingerprint and the call security responses from call authentication computing platforms 160, 170 to determine a call security score for a given telephone call made by user computing device 190 to systems secured by platform 110. In some aspects, the call security score may represent a numerical value that indicates a confidence level for the authenticity of the telephone call being evaluated. For example, the call security score may range from 0 to 100, with 0 representing no confidence that a given telephone call is authentic and 100 representing total confidence that the call is authentic.

Call forwarding system 180 may include one or more computing devices configured to receive telephone calls from various types of user computing devices 190, identify information related to call security from those calls, and then forward the identified information to call security assessment computing platform 110. In one example, call forwarding system 180 may generate a Session Initial Protocol (SIP) header message including the identified call security information and may forward the SIP header to platform 110. In some aspects, the information identified by call forwarding system 180 in generating a SIP header may include information related to whether the telephone call was made from a mobile phone or a landline, a location from which the telephone call was made (e.g., geospatial coordinates, city/state information, and the like), and a phone number from which the telephone call was made. In some aspects, call forwarding system 180 may be configured to generate a SIP header for calls made from any type of user computing device 190 (e.g., mobile phone, landline, internet phone, and the like).

User computing device 190 may be a mobile phone, landline, or some other computing device configured to communicate with other computing devices. User computing device 190 may be configured to communicate via a text, audio, video, or audio-video interface. User computing device 190 may attempt to access systems secured by call security assessment computing platform 110. In one example, a user of user computing device 190 may make a telephone call to access financial computing systems secured by call security assessment computing platform 110. In this example, the user may attempt to access financial computing systems to perform a financial transaction (e.g., bank account money transfer, bill payment, and the like). The user may dial a phone number that initially connects the user to call forwarding system 180. Then call forwarding system 180 may generate a message (e.g., a message with a SIP header) with information about the telephone call and may forward that message to call security assessment computing platform 110.

Computing environment 100 also may include one or more networks, which may interconnect one or more of call security assessment computing platform 110, user call history datastore 120, call handling system 130, call authentication computing platform 160, call authentication computing platform 170, call forwarding system 180, and user computing device 190. For example, computing environment 100 may include private network 140, which may be owned and/or operated by a specific organization and/or which may interconnect one or more systems and/or other devices associated with the specific organization. For example, call security assessment computing platform 110, user call history datastore 120, and call handling system 130 may be owned and/or operated by a specific organization, such as a financial institution, and private network 140 may interconnect call security assessment computing platform 110, user call history datastore 120, call handling system 130, and one or more other systems and/or devices associated with the organization. Additionally, private network 140 may connect (e.g., via one or more firewalls) to one or more external networks not associated with the organization, such as public network 150. Public network 150 may, for instance, include the internet and may connect various systems and/or devices not associated with the organization operating private network 140. For example, public network 150 may interconnect call authentication computing platform 160, call authentication computing platform 170, call forwarding system 180, user computing device 190, and/or various other systems and/or devices.

In some arrangements, the computing devices that make up and/or are included in call security assessment computing platform 110, user call history datastore 120, call handling system 130, call authentication computing platform 160, call authentication computing platform 170, call forwarding system 180, and user computing device 190 may be any type of computing device capable of receiving a user interface, receiving input via the user interface, and communicating the received input to one or more other computing devices. For example, the computing devices that make up and/or are included in call security assessment computing platform 110, user call history datastore 120, call handling system 130, call authentication computing platform 160, call authentication computing platform 170, call forwarding system 180, and user computing device 190 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the computing devices that make up and/or are included in call security assessment computing platform 110, user call history datastore 120, call handling system 130, call authentication computing platform 160, call authentication computing platform 170, call forwarding system 180, and user computing device 190 may, in some instances, be special-purpose computing devices configured to perform specific functions.

Figure 1B:
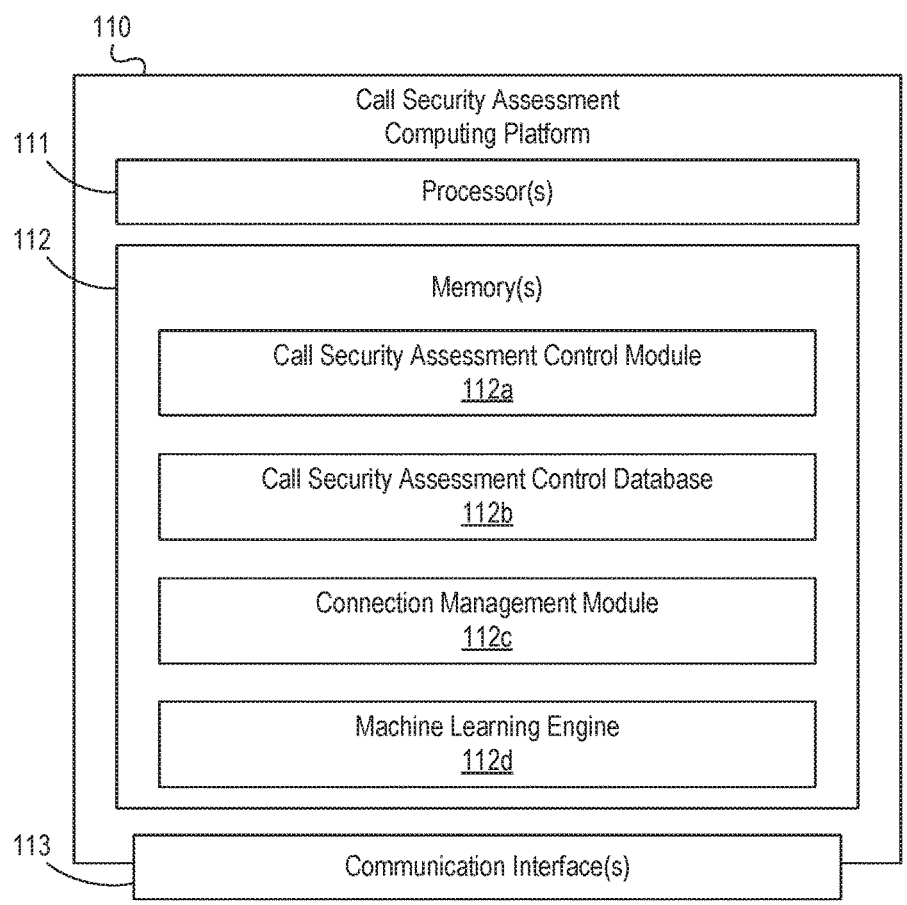

Referring to FIG. 1B, call security assessment computing platform 110 may include one or more processor(s) 111, memory(s) 112, and communication interface(s) 113. A data bus may interconnect processor(s) 111, memory(s) 112, and communication interface(s) 113. Communication interface(s) 113 may be one or more network interfaces configured to support communications between call security assessment computing platform 110 and one or more networks (e.g., private network 140, public network 150). For example, call security assessment computing platform 110 may establish one or more connections and/or communication links to one or more other systems and/or devices (e.g., user call history datastore 120, call handling system 130, call authentication computing platform 160, call authentication computing platform 170, call forwarding system 180, and user computing device 190) via communication interface(s) 113, and call security assessment computing platform 110 may exchange data with the one or more other systems and/or devices (e.g., user call history datastore 120, call handling system 130, call authentication computing platform 160, call authentication computing platform 170, call forwarding system 180, and user computing device 190) via communication interface(s) 113 while the one or more connections and/or communication links are established. Memory(s) 112 may include one or more program modules having instructions that when executed by processor(s) 111 cause call security assessment computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of call security assessment computing platform 110 and/or by different computing devices that may form and/or otherwise make up call security assessment computing platform 110.

For example, memory(s) 112b may have, store, and/or include a call security assessment control module 112a, a call security control database 112b, a connection management module 112c, and a machine learning engine 112d. Call security assessment control module 112a may have, store, and/or include instructions that direct and/or cause call security assessment computing platform 110 to assess whether or not incoming telephone calls are authentic, as discussed in greater detail below. Call security assessment control database 112b may store information used by call security assessment computing platform 110 in assessing whether or not incoming telephone calls are authentic in computing environment 100 and in performing other associated functions. Connection management module 112c may have, store, and/or include instructions that direct and/or cause call security assessment computing platform 110 to establish one or more connections and/or communication links to one or more other systems and/or devices (e.g., user call history datastore 120, call handling system 130, call authentication computing platform 160, call authentication computing platform 170, call forwarding system 180, and user computing device 190) via communication interface(s) 113 and/or to manage and/or otherwise control the exchanging of data with the one or more other systems and/or devices (e.g., user call history datastore 120, call handling system 130, call authentication computing platform 160, call authentication computing platform 170, call forwarding system 180, and user computing device 190) via communication interface(s) 113 while the one or more connections and/or communication links are established. Machine learning engine 112*d* may have, store, and/or include instructions that direct and/or cause call security assessment computing platform 110 to dynamically analyze data received by call security assessment computing platform 110 based on historical data sets and/or present operations and automatically optimize the functions provided by call security assessment computing platform 110 based on analyzing such data. In some examples, one or more of the call authentication computing platforms 160, 170 may also include a machine learning engine 112*d* that uses predetermined rules to evaluate the security features of a given telephone call.

Figure 2B:
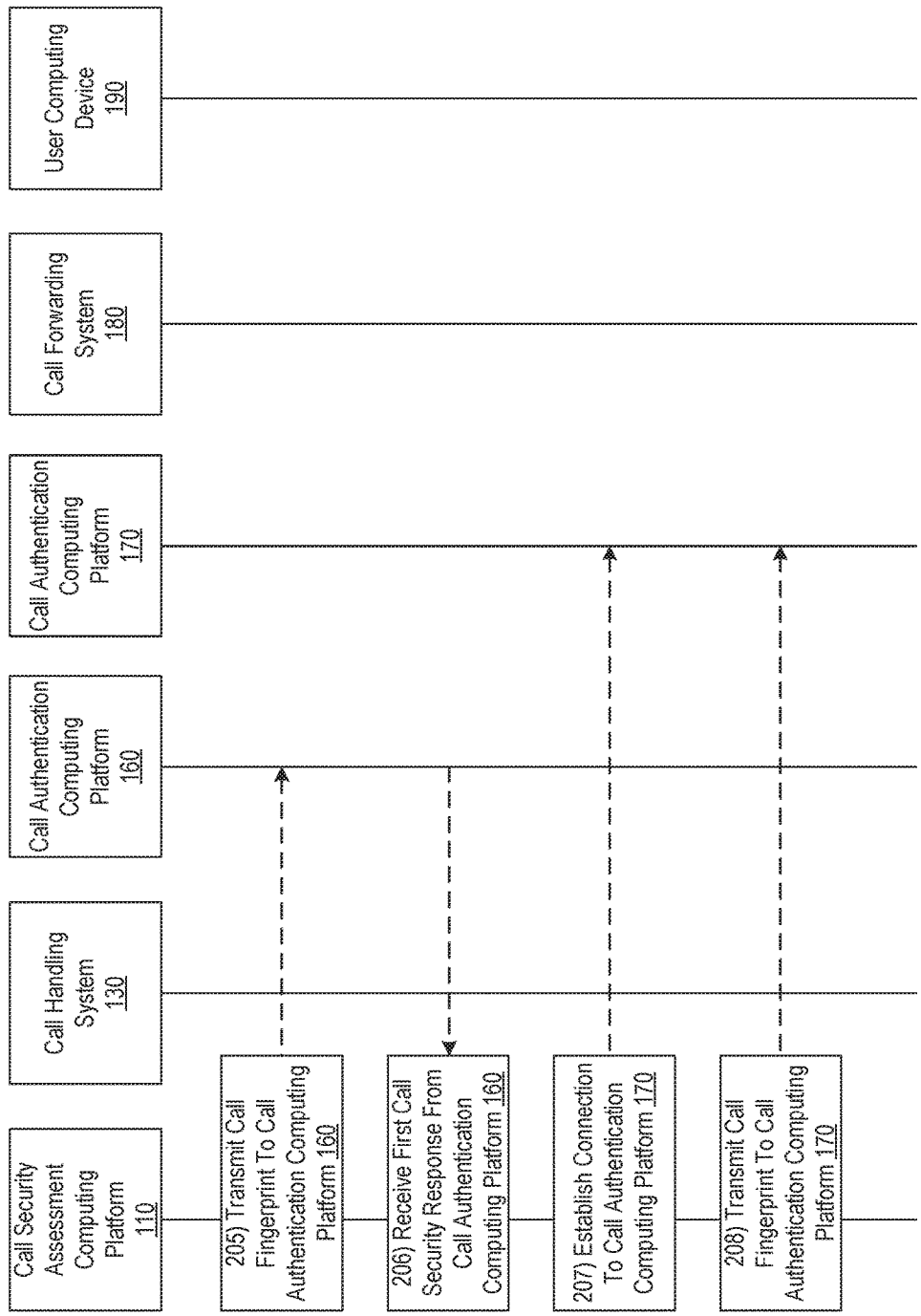
Figure 2C:
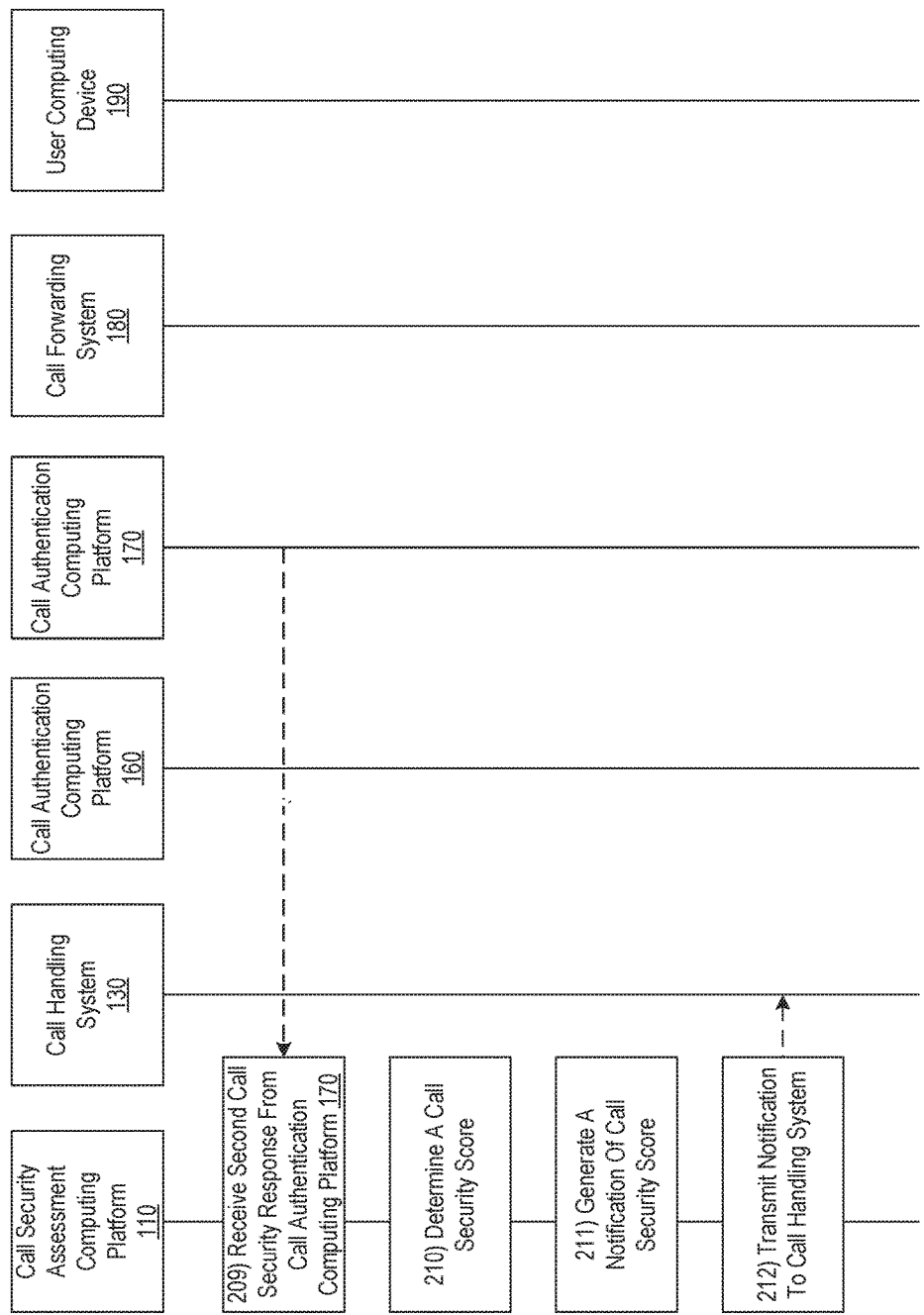

FIGS. 2A-2E depict an illustrative event sequence for multicomputer processing and authentication of user data in accordance with one or more example embodiments. Referring to FIG. 2A, at step 201, call security assessment computing platform 110 may receive, via communication interface 113, data about a telephone call from call forwarding system 180. The telephone call may be made by a user of user computing device 190 to access systems secured by platform 110. Call forwarding system 180 may receive the telephone call and then generate a message with information about the telephone call. In general, the message forwarded by call forwarding system 180 to call security assessment computing platform 110 may be in the form of a Session Initiation Protocol (SIP) header message with information about user computing device 190. For example, the SIP header message may include information related to whether the telephone call was made from a mobile phone or a landline, whether the phone was in roaming mode if the call was made from a mobile phone, a location from which the telephone call was made (e.g., as specified by geospatial coordinates, city/state information, and the like), and a phone number from which the telephone call was made, among other things. In one example, call security assessment computing platform 110 may secure systems provided by a financial institution such as a bank. In making a telephone call to systems secured by platform 110, a user of user computing device 190 may seek to perform a financial transaction using systems provided by the financial institution.

Once call security assessment computing platform 110 receives the data about a telephone call in step 201, platform 110 may parse the message to identify the SIP header information in step 202. For example, at this step, platform 110 may separate out information pertaining to the phone number, location, and type of user computing device 190 associated with the telephone call. Then, in step 203, platform 110 may analyze the header information to generate a call fingerprint. The call fingerprint may include information identified in the SIP header message, as well as any other information that platform 110 may have about the user computing device 190 and/or user that made the telephone call. The call fingerprint may serve as an initial measure of the authenticity of the telephone call and may be used to set an initial security level for the call (i.e., a level that is a measure of how likely the call is authentic). For example, platform 110 may communicate with user call history datastore 120 to determine that the identified phone number should be a mobile number whereas the SIP header message indicates that the phone from which the call was made is a landline. This type of inconsistency may raise a red flag as to the authenticity of the telephone call in question, and platform 110 may set an initial call security level of the call lower as a result of the inconsistency.

Next, in step 204, call security assessment computing platform 110 may establish, via communication interface 113, a connection to call authentication computing platform 160. Then, referring to FIG. 2B, at step 205, platform 110 may transmit the call fingerprint to call authentication computing platform 160 and may request that platform 160 determine additional security characteristics associated with the telephone call. For example, platform 110 may request that platform 160 identify an owner of user computing device 190 used to make the telephone call or may request that platform 160 identify previous calls made by user computing device 190 to systems secured by platform 110. In another example, platform 110 may request that platform 160 identify whether or not there is a denial of service attack by the telephone call. In yet other examples, platform 110 may request that platform 160 analyze an audio recording of the incoming telephone call to help determine authenticity or determine if a phone number associated with the user computing device 190 making the call is on a blacklist. In further examples, platform 110 may request that platform 160 determine if the telephone call in question is being spoofed. Platform 160 may make this determination in various ways, including, for example, by evaluating the amount of time elapsed between the time at which the telephone call in question is made and the time at which a second telephone call is made from the same user computing device 190. In this example, the two telephone calls may be made from different locations. Call authentication computing platform 160 may then determine the minimum amount of time that one would take travelling between the two locations and if the amount of time elapsed between the two telephone calls is less than this minimum travel time, then platform 160 may determine that the telephone call in question has been spoofed.

In some aspects, the call authentication service provided by platform 160 may overlap with capabilities of platform 110 or user call history datastore 120. In other aspects, platform 160 may provide call authentication services that cannot be provided directly by platform 110 or user call history datastore 120. Once platform 160 has analyzed the received call fingerprint and handled the request made by platform 110, platform 160 may generate a call security response and transmit that response to platform 110 in step 206.

Similarly, in step 207, call security assessment computing platform 110 may establish, via communication interface 113, a connection to call authentication computing platform 170. Then, at step 208, platform 110 may transmit the call fingerprint to call authentication computing platform 170 and may request that platform 170 determine additional security characteristics associated with the telephone call. Platform 170 may provide a call authentication service different from or the same as the call authentication service provided by platform 160 (e.g., identification of an owner of user computing device 190 used to make the telephone call, identification of previous calls made by user computing device 190, analysis of multiple calls from the same user computing device 190 but from different locations, and the like). Then, referring to FIG. 2C, platform 170 may transmit a call security response to platform 110 in step 209. In the instance where platforms 160, 170 provide the same call authentication service, platform 110 may decide to use both platforms 160, 170 to confirm that the call security responses from platforms 160, 170 are consistent.

In some examples, call security assessment computing platform 110 and call authentication computing platforms 160, 170 may include a machine learning engine 112d that uses predetermined rules to assess the authenticity of a telephone call. For example, machine learning engine 112d may include rules that deem a call to be unauthentic when the call is associated with a phone number already known to be unauthentic. As another example, machine learning engine 112d may include additional rules that deem a call to be likely unauthentic when the user answers one or more questions incorrectly. As machine learning engine 112d is exposed to more telephone calls, engine 112d may alter which rules are applied or how rules are applied to the decision-making process. For example, if machine learning engine 112d determines that many users answer questions incorrectly even when the call is authentic (e.g., in a scenario where the user does not remember the correct answer to a question), machine learning engine 112d may weight an incorrect response to a question less heavily in assessing whether a call is unauthentic.

Subsequently, in step 210, call security assessment computing platform 110 may determine a call security score based on the call fingerprint and the call security responses received in step 206 and 209. The call security score may represent a measure of how likely the telephone call in question is authentic. In some examples, the call security score may represent a numerical value with a lower value assigned to a telephone call that is less likely to be authentic and a higher value assigned to a telephone call that is more likely to be authentic. In some aspects, platform 110 may determine a call security score by comparing the call fingerprint and the call security responses to an expected call fingerprint and expected call security responses. In this regard, platform 110 may have developed the characteristics or norms associated with an expected authentic telephone call (e.g., by having evaluated the call characteristics of many telephone calls and having determined whether those calls were authentic). Platform 110 may then use these norms (i.e., expected call fingerprints and call security responses) to determine whether a given call fingerprint and associated call security responses are authentic (e.g., as reflected by the call security score assigned to the telephone call). In step 211, platform 110 may generate a notification of the call security score to be transmitted to call handling system 130, and in step 212, platform 110 may transmit the notification to call handling system 130.

Figure 2D:
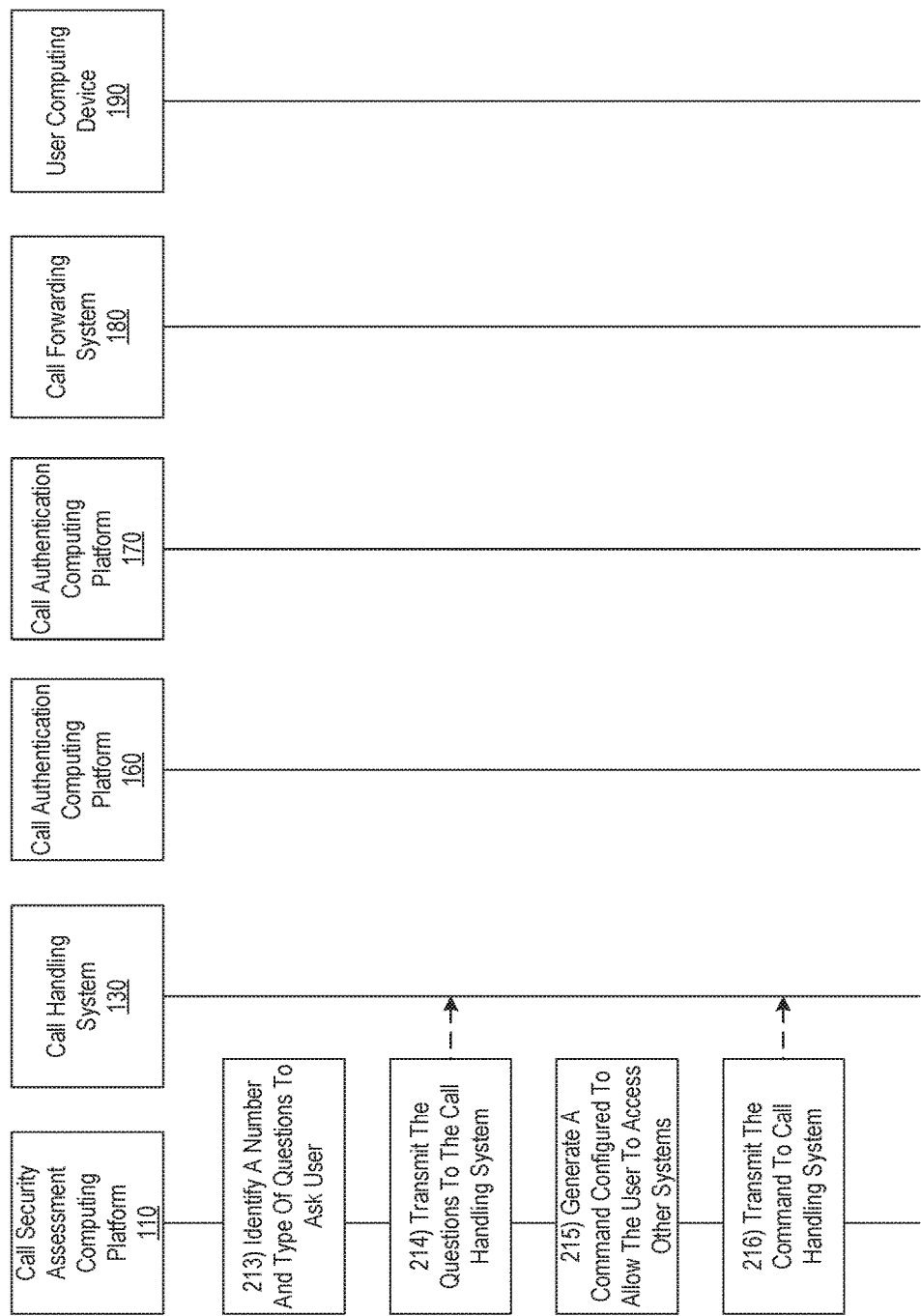

Call handling system 130 may be a fully automated system or may further involve one or more human operators or agents. System 130 may use the call security score to determine how to handle the telephone call. Referring to FIG. 2D, in step 213, call security assessment computing platform 110 may further identify the number and type of questions to ask a user of user computing device 190 based on the call security score. In one aspect, the number of questions may be higher and the type of questions may be more detailed as the call security score is lower (i.e., is indicative of a telephone call that is less likely to be authentic). For example, if the call security score is high, platform 110 may decide that the user should be asked only one question and that question may be relatively simple (e.g., "What is your date of birth?"). However, if the call security score is low, platform 110 may decide that the user should be asked many questions and those questions may be more involved (e.g., "Provide the amount of a recent transaction or request an out of band one time password."). Once the appropriate questions have been identified, platform 110 may transmit, in step 214, the questions to call handling system 130 so that call handling system 130 may later pose those questions to the user. In yet further examples, if the call security score is low enough (e.g., below a predetermined threshold), platform 110 may decide that call handling system 130 should ask many questions of the user, but the user should never obtain access to systems secured by call security assessment computing platform 110.

If the call security score of the telephone call is not below a predetermined threshold, platform 110 may generate, in step 215, a command configured to allow the user of user computing device 190 to access desired systems secured by platform 110 when the questions transmitted in step 215 are answered correctly. Next, in step 216, platform 110 may transmit the command generated in step 215 to call handling system 130 so that call handling system 130 can provide access if and when the user answers the questions correctly. In some examples, the command may be configured to provide access to financial transaction systems operated by a financial institution such as a bank. In this example, if the user decides to perform a financial transaction in lieu of merely accessing his financial accounts, platform 110 may transmit additional questions to platform 130 for presentation to the user. Platform 130 may then allow the user to perform the financial transaction only if these additional questions are answered correctly.

Figure 3:
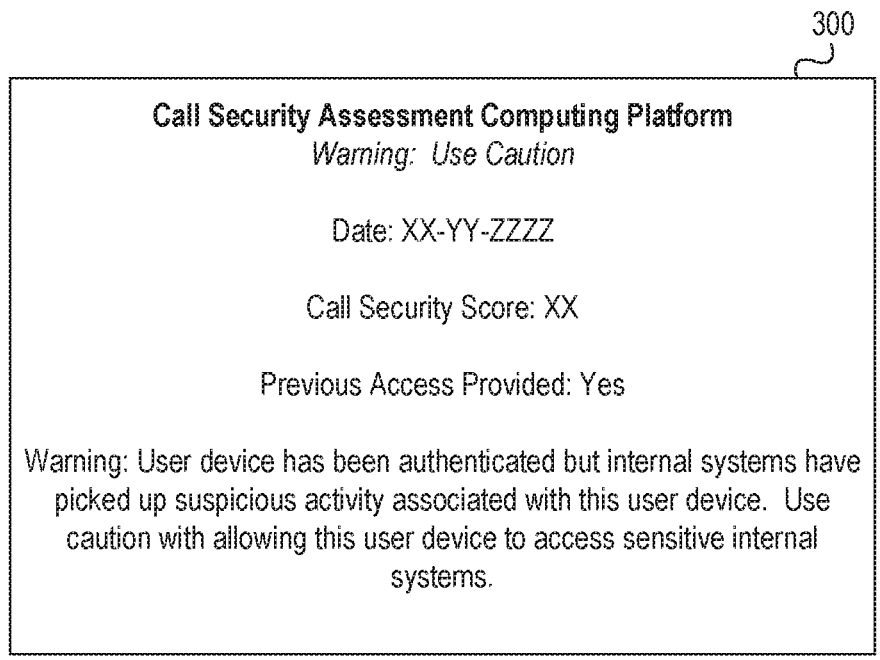
FIG. 3 depicts a first example warning message transmitted from a call security assessment computing platform to a call handling system in accordance with one or more example embodiments.
Figure 4:
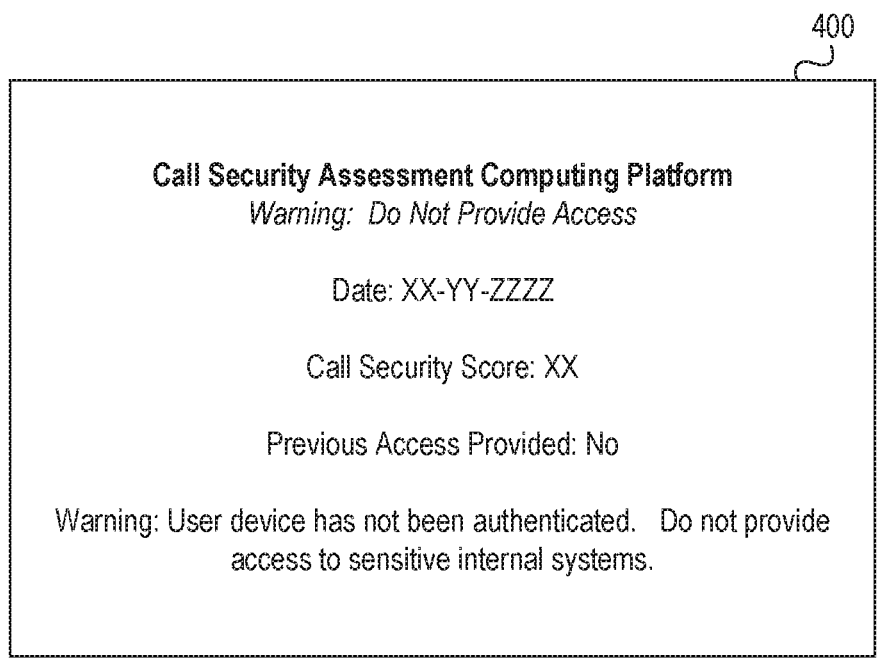
FIG. 4 depicts a second example warning message transmitted from a call security assessment computing platform to a call handling system in accordance with one or more example embodiments.

Referring to FIG. 2E, in step 217, call security assessment computing platform 110 may generate any appropriate warning messages based on the call security score and in step 218, platform 110 may transmit these warning messages to call handling system 130. Further, in step 219, platform 110 may cause call handling system 130 to display the warning messages to, for example, an agent that may interact with a user of user computing device 190. In one example, the warning message may indicate that while user computing device 190 has been authenticated, there are still problems with the telephone call made by this user computing device 190, as shown in FIG. 3. Message 300 may include the date that the warning message was generated, the call security score of the telephone call in question, an indication of whether the user computing device 190 associated with the call has previously accessed systems secured by platform 110, and a message for consideration by call handling system 130 prior to engaging the user of user computing device 190. In another example, the warning message may indicate that that user computing device 190 has not been authenticated (e.g., as evidenced by a call security score below a predetermined threshold) and that the user computing device 190 should not be given access to internal systems, as shown in message 400 of FIG. 4. In other aspects, call handling system 130 may not display the warning messages. Rather, call security assessment computing platform 110 may simply transmit appropriate warning messages to call handling system 130 in order to adjust how the call is handled (e.g., decide whether access to internal systems should be given).

Finally, in step 220, if the telephone call made by user computing device 190 has been authenticated, call security assessment computing platform 110 may transmit an authentication message to user computing device 190. In one example, the authentication message may indicate that the user device 190 has been properly authenticated for a given purpose (e.g., for performing a financial transaction, gaining access to account information, and the like).

Figure 5:
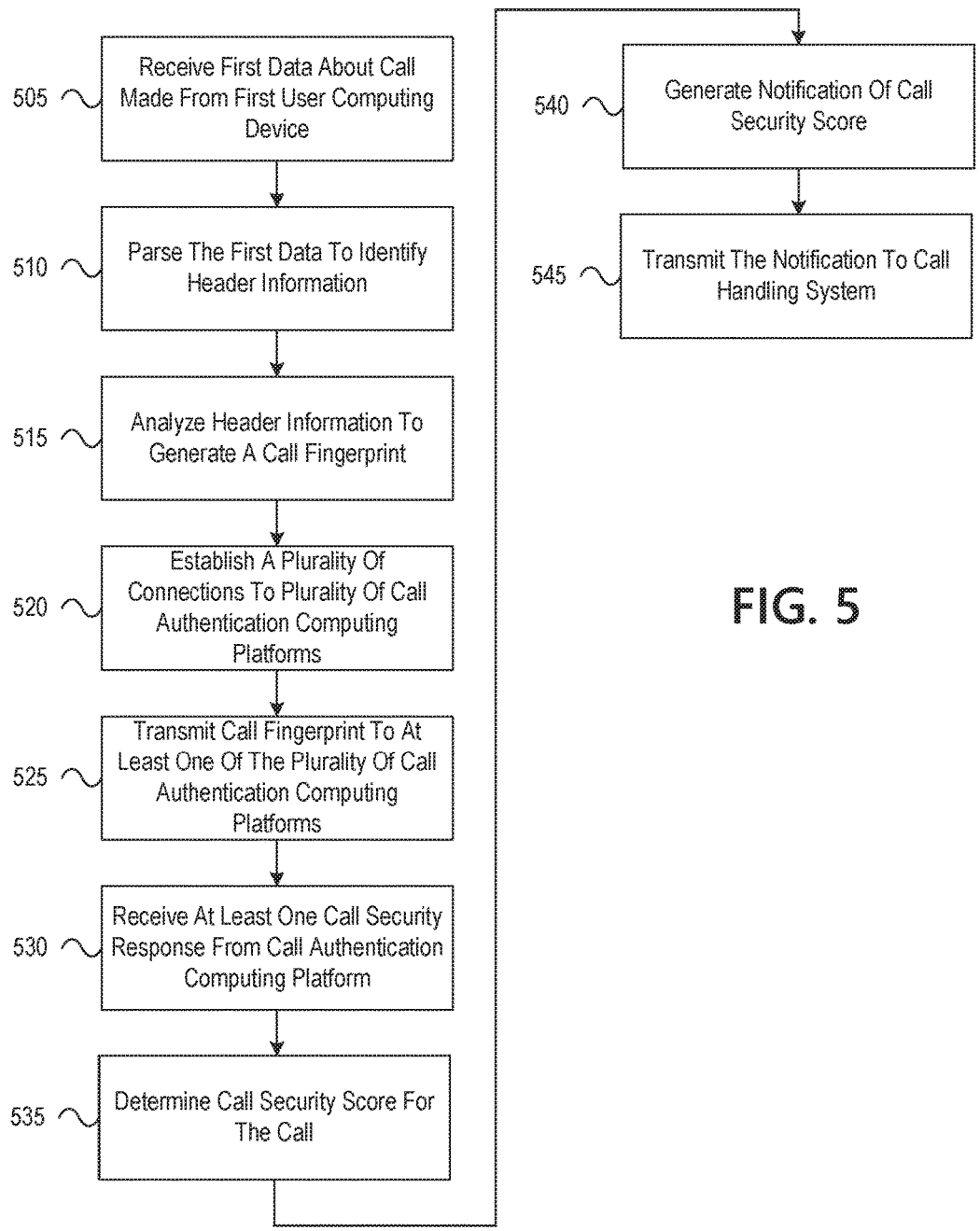
FIG. 5 depicts an illustrative method for multicomputer processing and authentication of user data in accordance with one or more example embodiments.

FIG. 5 depicts an illustrative method for multicomputer processing and authentication of user data in accordance with one or more example embodiments. Referring to FIG. 5, at step 505, a computing platform having at least one processor, a memory, and a communication interface may receive, via the communication interface, first data associated with a first telephone call made from a first user computing device. Subsequently, at step 510, the computing platform may parse the first data to identify header information in a Session Initiation Protocol (SIP) header of the first data. Then, at step 515, the computing platform may analyze the header information to generate a call fingerprint for the first telephone call, and at step 520, the computing platform may establish, via the communication interface, a plurality of connections to a plurality of call authentication computing platforms. At step 525, with the plurality of connections established, the computing platform may transmit the call fingerprint to at least one of the plurality of call authentication computing platforms. At step 530, with the plurality of connections established, the computing platform may receive at least one call security response from the at least one of the plurality of call authentication computing platforms. The at least one call security response may comprise data including an identification of a first user of the first user computing device and a record of any previous calls made from the first user computing device. Next, in step 535, the computing platform may determine, based on the call fingerprint and the at least one call security response, a call security score for the first telephone call made by the first user computing device. Then, in step 540, the computing platform may generate a first notification of the call security score to a call handling system. Finally, in step 545, the computing platform may transmit, via the communication interface, the first notification to the call handling system.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
    at least one processor;
    a communication interface communicatively coupled to the at least one processor; and
    memory storing computer-readable instructions that, when executed by the at least one processor, cause the computing platform to:
        receive, via the communication interface, first data associated with a first telephone call made from a first user computing device;
        analyze the first data to generate a call fingerprint for the first telephone call;
        establish, via the communication interface, a connection to at least one call authentication computing platform;
        with the connection established, transmit the call fingerprint to the at least one call authentication computing platform;
        with the connection established, receive at least one call security response from the at least one call authentication computing platform, wherein the at least one call security response comprises data including an identification of a first user of the first user computing device and a record of any previous calls made from the first user computing device;
        based on the call fingerprint and the at least one call security response, determine a call security score for the first telephone call made by the first user computing device;
        generate a first notification of the call security score to a call handling system; and transmit, via the communication interface, the first notification to the call handling system.

2. The computing platform of claim 1, wherein the at least one call authentication computing platform comprises a computing device configured to determine if the first telephone call is being spoofed by evaluating a first amount of time between the first telephone call and a second telephone call, wherein the first telephone call is made with the first user computing device from a first location and the second telephone call is made with the first user computing device from a second location.

3. The computing platform of claim 2, wherein determining if the first telephone call is being spoofed further comprises:
determining a minimum amount of time for travelling between the first location and the second location; and
determining that the first telephone call is being spoofed when the first amount of time is less than the minimum amount of time.

4. The computing platform of claim 1, wherein analyzing the first data comprises:
identifying whether the first telephone call was made from a mobile phone or landline, a location from which the first telephone call was made, and a phone number from which the first telephone call was made; and
setting an initial call security level based on the identifying.

5. The computing platform of claim 1, wherein the memory stores additional computer-readable instructions that, when executed by the at least one processor, cause the computing platform to:
identify a number and type of questions to ask the first user based on the call security score, wherein the number of questions is greater and the type of questions are more detailed as the call security score is lower; and
transmit, via the communication interface, the questions to the call handling system.

6. The computing platform of claim 5, wherein the memory stores additional computer-readable instructions that, when executed by the at least one processor, cause the computing platform to:
based on the call security score, generate a command configured to allow the first user to access other systems when the questions are answered correctly; and
transmit, via the communication interface, the command to the call handling system.

7. The computing platform of claim 1, wherein the at least one call authentication computing platform comprises a machine learning system that uses predetermined rules to evaluate security features of the first telephone call.

8. The computing platform of claim 1, wherein the first data includes information related to whether the first user computing device comprises a mobile device or a landline.

9. The computing platform of claim 1, wherein the first data includes information related to whether the first user computing device was roaming when the first telephone call was made.

10. The computing platform of claim 1, wherein determining the call security score comprises comparing the call fingerprint and the at least one call security response to an expected call fingerprint and expected call security response.

11. The computing platform of claim 1, wherein the memory stores additional computer-readable instructions that, when executed by the at least one processor, cause the computing platform to:
based on the call security score, route the first telephone call to one of a plurality of agents in communication with the call handling system.

12. The computing platform of claim 11, wherein the memory stores additional computer-readable instructions that, when executed by the at least one processor, cause the computing platform to:
generate a warning message to be transmitted to the call handling system;
transmit, via the communication interface, the warning message to the call handling system; and
cause the call handling system to adjust how the first telephone call is handled.

13. A method, comprising:
at a computing platform comprising at least one processor, memory, and a communication interface:
receiving, via the communication interface, first data associated with a first telephone call made from a first user computing device;
analyzing the first data to generate a call fingerprint for the first telephone call;
establishing, via the communication interface, a connection to at least one call authentication computing platform;
with the connection established, transmitting the call fingerprint to the at least one call authentication computing platform;
with the connection established, receiving at least one call security response from the at least one call authentication computing platform, wherein the at least one call security response comprises data including an identification of a first user of the first user computing device and a record of any previous calls made from the first user computing device;
based on the call fingerprint and the at least one call security response, determining a call security score for the first telephone call made by the first user computing device;
generating a first notification of the call security score to a call handling system; and
transmitting, via the communication interface, the first notification to the call handling system.

14. The method of claim 13, further comprising:
identifying a number and type of questions to ask the first user based on the call security score, wherein the number of questions is greater and the type of questions are more detailed as the call security score is lower; and
transmitting, via the communication interface, the questions to the call handling system.

15. The method of claim 14, further comprising:
based on the call security score, generating a command configured to allow the first user to access other systems when the questions are answered correctly; and
transmitting, via the communication interface, the command to the call handling system.

16. The method of claim 13, wherein determining the call security score comprises comparing the call fingerprint and the at least one call security response to an expected call fingerprint and expected call security response.

17. The method of claim 13, further comprising: based on the call security score, routing the first telephone call to one of a plurality of agents in communication with the call handling system.

18. The method of claim 17, further comprising:
generating a warning message to be transmitted to the call handling system;

transmitting, via the communication interface, the warning message to the call handling system; and
causing the call handling system to adjust how the first telephone call is handled.

19. The method of claim 13, further comprising:
identifying whether the first telephone call was made from a mobile phone or landline, a location from which the first telephone call was made, and a phone number from which the first telephone call was made; and
setting an initial call security level based on the identifying.

20. One or more non-transitory computer-readable media storing instructions that, when executed by a computing platform comprising at least one processor, memory, and a communication interface, cause the computing platform to:
receive, via the communication interface, first data associated with a first telephone call made from a first user computing device;
analyze the first data to generate a call fingerprint for the first telephone call;
establish, via the communication interface, a connection to at least one call authentication computing platform;
with the connection established, transmit the call fingerprint to the at least one call authentication computing platform;
with the connection established, receive at least one call security response from the at least one call authentication computing platform, wherein the at least one call security response comprises data including an identification of a first user of the first user computing device and a record of any previous calls made from the first user computing device;
based on the call fingerprint and the at least one call security response, determine a call security score for the first telephone call made by the first user computing device;
generate a first notification of the call security score to a call handling system; and
transmit, via the communication interface, the first notification to the call handling system.

* * * * *